United States Patent
Hill, Jr.

(10) Patent No.: US 8,661,671 B2
(45) Date of Patent: Mar. 4, 2014

(54) METHOD FOR MAKING CATALYTIC CONVERTERS WITH AUTOMATED SUBSTRATE CRACK DETECTION

(75) Inventor: Frederick B. Hill, Jr., Rockford, MI (US)

(73) Assignee: Benteler Automotive Corporation, Auburn Hills, MI (US)

( * ) Notice: Subject to any disclaimer, the term of this patent is extended or adjusted under 35 U.S.C. 154(b) by 229 days.

(21) Appl. No.: 13/096,068

(22) Filed: Apr. 28, 2011

(65) Prior Publication Data

US 2011/0232065 A1 Sep. 29, 2011

Related U.S. Application Data

(63) Continuation-in-part of application No. 11/520,017, filed on Sep. 12, 2006, now abandoned.

(51) Int. Cl.
*B21D 51/16* (2006.01)
(52) U.S. Cl.
USPC .................................................. 29/890
(58) Field of Classification Search
USPC .................................................. 29/428, 890
See application file for complete search history.

(56) References Cited

U.S. PATENT DOCUMENTS

| | | | |
|---|---|---|---|
| 4,207,593 A | 6/1980 | Deutsch et al. | |
| 4,519,041 A | 5/1985 | Fant et al. | |
| 5,179,419 A | 1/1993 | Palmquist et al. | |
| 5,539,656 A | 7/1996 | Annigeri et al. | |
| 5,673,203 A | 9/1997 | Annigeri et al. | |
| 5,699,153 A | 12/1997 | Takamoto et al. | |
| 5,991,017 A | 11/1999 | Clark | |
| 6,061,086 A | 5/2000 | Reimer et al. | |
| 6,510,239 B1 | 1/2003 | Wieres et al. | |
| 6,732,429 B2 | 5/2004 | Houliang et al. | |
| 6,732,432 B2 | 5/2004 | Foster et al. | |
| 6,769,281 B2 | 8/2004 | Irie et al. | |
| 7,283,224 B1 | 10/2007 | Smithgall | |
| 2003/0185430 A1 | 10/2003 | Theobald et al. | |
| 2004/0031149 A1 | 2/2004 | Irie et al. | |
| 2004/0247171 A1 | 12/2004 | Hashimoto et al. | |
| 2005/0138786 A1 | 6/2005 | Irie et al. | |
| 2005/0174567 A1 | 8/2005 | Hanna | |

FOREIGN PATENT DOCUMENTS

JP 2005273586 10/2005

*Primary Examiner* — David Bryant
*Assistant Examiner* — Moshe Wilensky
(74) *Attorney, Agent, or Firm* — Rader, Fishman & Grauer PLLC

(57) ABSTRACT

A method for making catalytic converters with automated crack detection includes forming a rigid housing, providing a substrate shaped for reception in the housing, and forming a mat shaped to cover the exterior surface of the substrate and having a thickness which creates a tight friction fit between the substrate and the housing when the same are assembled. The mat is wrapped around the substrate, and the wrapped substrate is then stuffed into the housing using a reciprocating ram or the like that extends at a relatively constant speed. The stuffing force and the ram position are measured and recorded regularly to define an array of data. The data is analyzed for any abrupt changes in the stuffing force as a function of the ram position indicating a crack in the assembled substrate.

19 Claims, 4 Drawing Sheets

METHOD FOR MAKING CATALYTIC CONVERTERS WITH AUTOMATED SUBSTRATE CRACK DETECTION

CROSS-REFERENCE TO RELATED APPLICATION

This application is a continuation-in-part of U.S. patent application Ser. No. 11/520,017, entitled METHOD FOR MAKING CATALYTIC CONVERTERS WITH AUTOMATED SUBSTRATE CRACK DETECTION, filed on Sep. 12, 2006 now abandoned, the disclosure of which is hereby incorporated by reference in its entirety.

BACKGROUND OF THE INVENTION

The present invention relates to catalytic converters for internal combustion engine exhaust gases and the like, and in particular to a method for making catalytic converters with automated crack detection.

Catalytic converters are commonly used to reduce noxious emissions in the exhaust gases of internal combustion engines, particularly those associated with vehicles. Such catalytic converters typically include a substrate made from cordierite, silicon carbide, aluminum titanate or the like, and have a honeycomb construction with axially extending, open ended cells through which the exhaust gases pass for treatment. Such substrates, which are relatively fragile or frangible, are wrapped with a mat and then stuffed into a rigid housing to create a tight friction fit between the substrate and the housing. Due to the fragile nature of the substrates, the same often develop cracks or fissures therein either during handling, prior to stuffing in the housing, or during the stuffing process itself. Such cracks can severely impair the operation and effectiveness of the catalytic converter, and therefore must be detected and addressed prior to use of the catalytic converter in a vehicle.

While visual inspection of the finished catalytic converter parts does detect some such substrate cracks, such processes are relatively time-consuming, labor intensive, and are not very effective in locating internal fissures in the substrate.

As disclosed in the Bowman U.S. Pat. No. 7,377,038, in the art of making catalytic converters, there are currently two basic methods or processes for assembling the substrate, the mat, and the housing. The first method is referred to as a "soft" or "loose" stuff method, wherein the mat is first wrapped about the exterior surface of the substrate and then inserted into an oversized housing, thereby resulting in little or no compression of the mat during the stuffing process. Next, the diameter of the housing is reduced through the use of a swaging die, or other similar tube forming machine, thereby compressing the mat between the interior surface of the housing and the exterior surface of the substrate to a predetermined final assembled mat density that creates a tight friction fit and seal between the housing and the substrate. The second method for assembling the parts of a catalytic converter is referred to as a "hard" or "tight" stuff process, wherein the mat is first wrapped around the exterior surface of the substrate and is then compressed to its final assembled mat density either before or during the insertion of the wrapped substrate into a rigid housing, which has been pre-formed into its predetermined final size and shape. The mat is compressed to its final assembled mat density during the stuffing process to create a tight friction fit and seal between the housing and the substrate. The housing is not reduced in diameter or otherwise resized after the wrapped substrate is inserted into the housing. Both processes have certain advantages and disadvantages. For example, in the soft stuff process, because the pressure on the fragile substrate is relatively low during the stuffing process, the substrates are seldom broken during the soft stuffing process. Furthermore, since the diameter of the housing is reduced to a predetermined size after assembly, and is normally controlled on the basis of the dimensions of the substrate, the mat, and the housing, the degree of compression of the mat can typically be carefully regulated, so as to avoid cracking the substrate during the housing resizing process, and to ensure the target assembled mat density is met. However, the soft stuffing process is more time-consuming and costly, since it requires an additional resizing process, and the use of an associated sophisticated forming machine. In contrast, the hard stuff process is relative quick and economical, since it can be accomplished in a single step. However, because the pressure on the fragile substrate during the hard stuffing process is rather high, the substrate can be broken more easily.

The Kobayashi U.S. Patent Publication No. 2007/0212269 discloses a soft stuffing method for making catalytic converters, wherein the catalyst is wrapped with a mat and inserted relatively loosely into an oversized outer cylindrical housing using a tapered stuffing cone. A pressing member is used to insert the wrapped substrate into the oversized housing, and includes a load cell, which detects the pressing force of the pressing member. The mat is compressed slightly so as to retain the wrapped substrate in a preselected position within the housing, as shown in FIGS. 5c and 5d, but is not yet compressed to its final assembled mat density. As best illustrated in FIG. 6, the soft stuffed assembly is then placed in a swaging device, which includes a swaging die having a plurality of radially extensible fingers that abut the outer peripheral wall of the outer cylindrical housing. A drive control unit controls the driving of a slider to move the ram, and consequently the slider for a predetermined amount of stroke. By this operation, the fingers of the swaging die are driven radially inwardly against the housing to reduce the diameter of the housing, and thereby achieve the target density of the mat. The amount of housing size down performed by the swaging device is computed as a function of the force detected by the load cell during the soft stuffing process. While the Kobayashi process does press fit or compress the mat around the substrate somewhat during assembly into the associated housing to make sure the same remains in its proper place in the housing, the same is still a soft stuff method that requires sizing the housing down after the wrapped substrate is fully inserted into the housing, and therefore involves the additional cost and fabrication time associated with soft stuff assembly techniques. Furthermore, the Kobayashi process does not include any type of post assembly crack detection process, particularly one that is automated and specifically designed for hard stuff assembly processes that are faster and more cost effective.

The Irie U.S. Patent Publication No. 2005/0138786 similarly discloses a soft stuff process for making catalytic converts, wherein a mat is wrapped about a substrate and loosely inserted or stuffed into a housing, and the diameter of the housing is thereafter reduced using shrinking dies. During the soft stuff process, a pushing member shifts the wrapped mat through a guide and into the housing, such that the mat is compress somewhat to a relatively small percentage of the final target mat compression. In order to maximize the speed of the soft stuffing step, and thereby reduce overall assembly time and cost, the stuffing load and stroke position are measured, compared, and adjusted to meet a previously determined maximum speed as shown in the graph of FIG. 29. The soft stuffing speed is thereby increased without exceeding the predetermined maximum stuffing load, which can be determined by actual test survey data, mathematical estimations, or the like. After the wrapped substrate has been fully inserted into the associated housing, the housing diameter is sized down or reduced using a shrinking mechanism as shown in FIGS. 12 and 13. While the Irie process does attempt to reduce assembly time by maximizing the speed at which the wrapped substrate is inserted into the associated housing, it is still a soft stuff process that requires additional costly shrinking machinery, as well as extra processing steps, time and expense, as compared to hard stuffing processes. Also, the Irie process does not include any type of post assembly automated crack detection process that insures the quality of the finished catalytic converter.

Hence, a hard stuff process for making catalytic converters having an automated crack detection system which is reliable, efficient and cost effective would clearly be beneficial.

SUMMARY OF THE INVENTION

One aspect of the present invention is to provide a hard stuff method for making catalytic converters with automated substrate crack detection, comprising the steps of forming a rigid housing with a hollow interior into a predetermined final size and shape, and providing a catalytic converter substrate having an exterior surface and a predetermined size and shape similar to the final size and shape of the housing to define a gap with a predetermined width between the substrate and the housing when the same are assembled. The method also includes the steps of forming a mat having a size and shape configured to cover the exterior surface of the substrate, a predetermined thickness which is greater than the width of the gap, and a radially compressible construction that is compressed inwardly against the exterior surface of the substrate to a predetermined final assembled mat density that creates a tight friction fit between the housing and the substrate when the same are assembled into a finished catalytic converter. The method also includes the steps of wrapping the mat around the outer surface of the substrate to define a wrapped substrate, and radially compressing the wrapped substrate to the predetermined final assembled mat density to define a compressed wrapped substrate. The method further includes the steps of hard stuffing the compressed wrapped substrate axially into the interior of the housing with the predetermined final size and shape using a reciprocating ram which extends at a predetermined, relatively constant speed to define the finished catalytic converter without resizing the housing, and regularly measuring the force applied by the ram to the wrapped substrate during the hard stuffing step. The method further includes the steps of regularly recording the ram force and the associated position of the ram during the hard stuffing step, and after the hard stuffing step is fully completed to define the finished catalytic converter, comparing the ram force as a function of the position of the ram to define an array of data. After the hard stuffing step is fully completed to define the finished catalytic converter, the method also includes the step of analyzing the array of data and ascertaining the existence of any abrupt change in the ram force as a function of the position of the ram above a predetermined ratio which indicates a crack in the fully assembled compressed wrapped substrate portion of the finished catalytic converter. The method also includes the step of unstuffing the fully assembled compressed wrapped substrate form the housing upon detection of a crack in the substrate during the analyzing step.

The present hard stuff method for making catalytic converters with automated substrate crack detection is reliable, efficient, effective and particularly well adapted for the proposed use. These and other advantages of the invention will be further understood and appreciated by those skilled in the art by reference to the following written specification, claims and appended drawings.

DETAILED DESCRIPTION OF THE PREFERRED EMBODIMENTS

Figure 1:
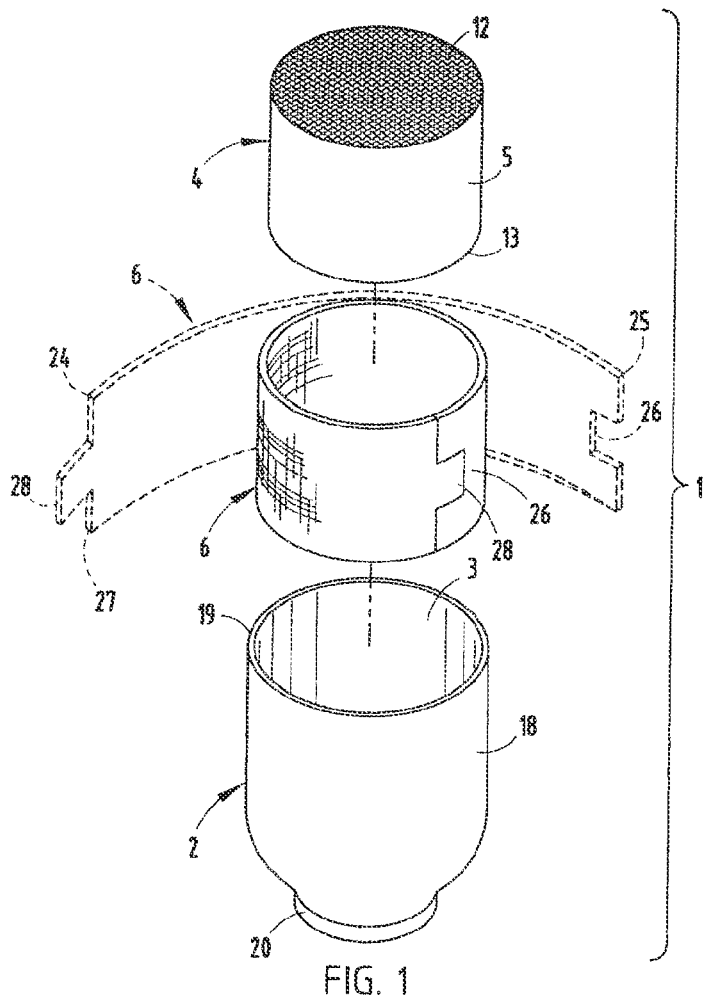
FIG. 1 is an exploded perspective view of a catalytic converter constructed in accordance with the method embodying the present invention.

For purposes of description herein, the terms "upper", "lower", "right", "left", "rear", "front", "vertical", "horizontal" and derivative thereof shall relate to the invention as oriented in FIG. 1. However, it is to be understood that the invention may assume various alternative orientations and step sequences, except where expressly specified to the contrary. It is also to be understood that the devices and processes illustrated in the attached drawings, and described in the following specification, are simply exemplary embodiments of the inventive concepts defined in the appended claims. Hence, specific dimensions and other physical characteristics relating to the embodiment disclosed herein are not to be considered as limiting, unless the claims expressly state otherwise.

Figure 2:
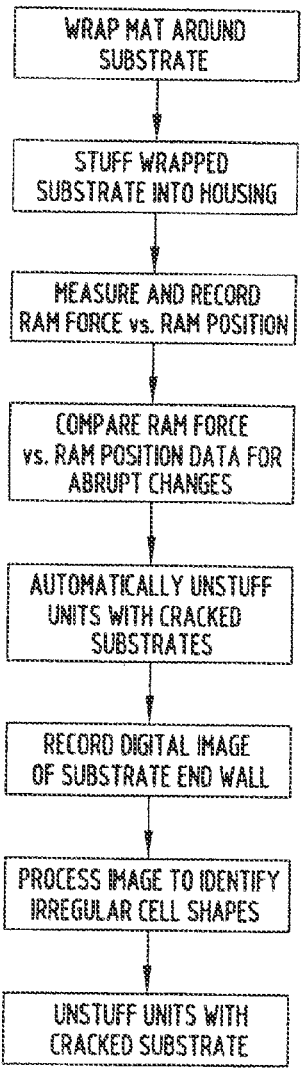
FIG. 2 is a schematic flowchart of the method.
Figure 4:
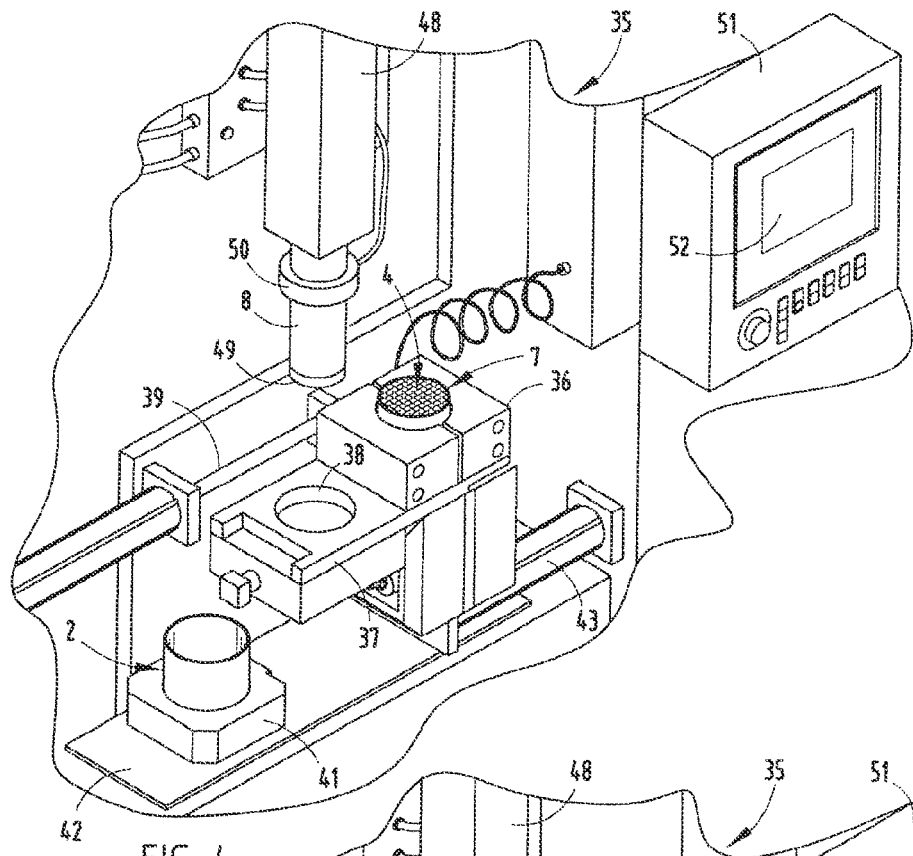
FIG. 4 is a fragmentary, partially schematic, perspective view of an assembly apparatus depicting the method for making catalytic converters, shown loading the substrate and housing into the machine prior to assembly.
Figure 5:
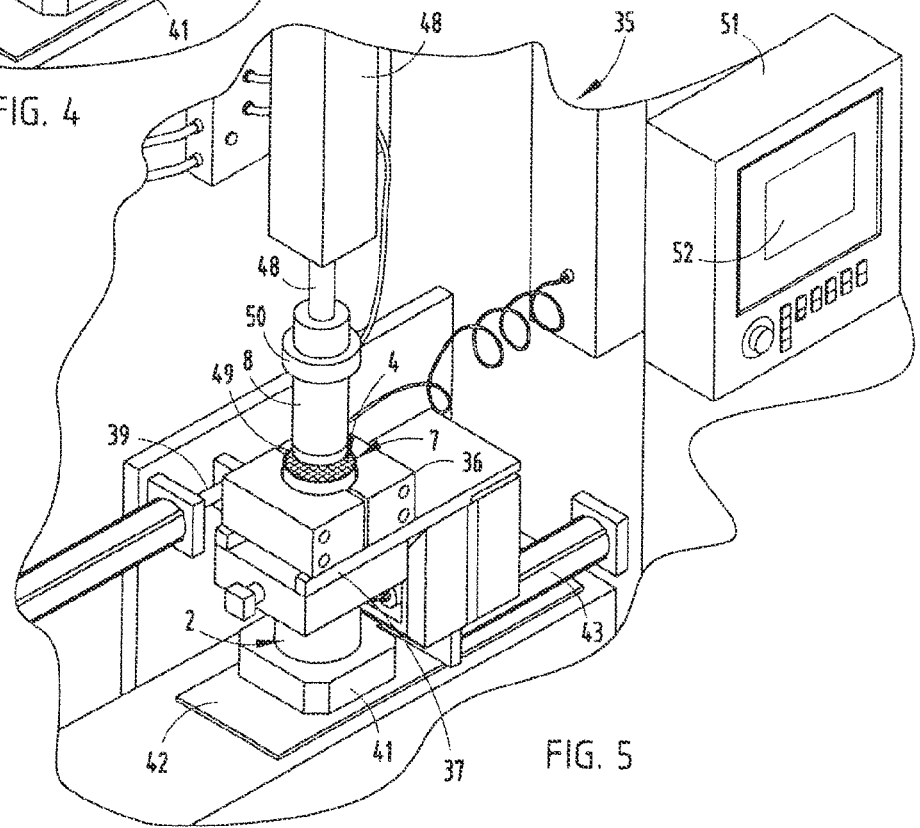
FIG. 5 is a fragmentary, partially schematic, perspective view of the assembly apparatus depicting the method for making catalytic converters, shown with the substrate and the housing vertically aligned prior to hard stuffing.
Figure 6:
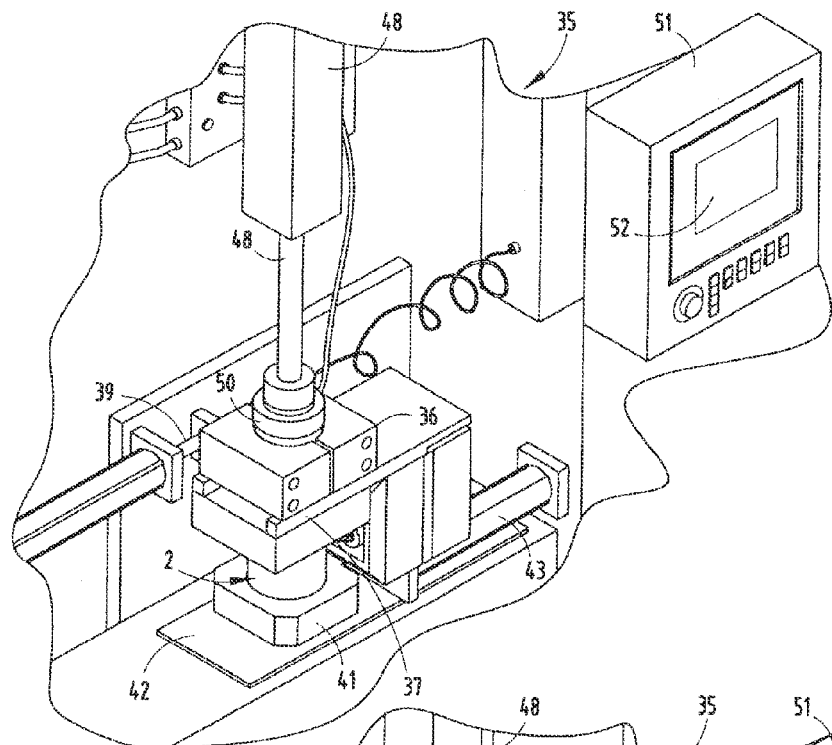
FIG. 6 is a fragmentary, partially schematic, perspective view of the assembly apparatus depicting the method for making catalytic converters, shown after the substrate has been fully hard stuffed into the housing.
Figure 7:
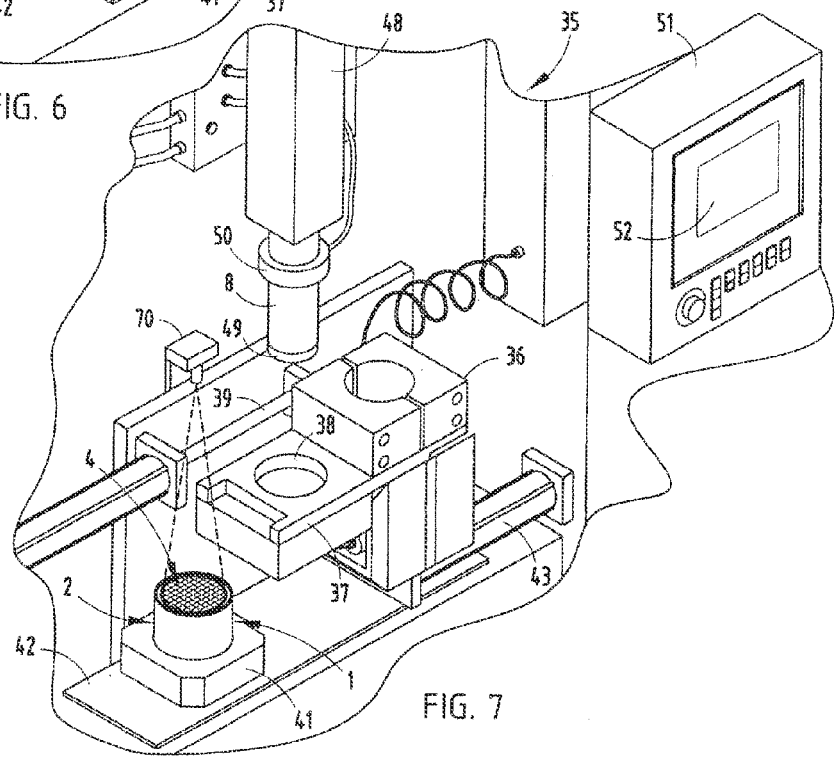
FIG. 7 is a fragmentary, partially schematic, perspective view of the assembly apparatus depicting the method for making catalytic converters, shown recording a digital image of an end wall surface of the substrate after hard stuffing in the housing.

The reference numeral 1 (FIG. 1) generally designates a catalytic converter made in accordance with the automated crack detection method embodying the present invention. The illustrated catalytic converter 1 has a generally conventional design, comprising a rigid housing 2 having a predetermined size and shape with a hollow interior 3. The illustrated catalytic converter 1 also includes a catalytic converter substrate 4 having an exterior surface 5 and a predetermined size and shape similar to the size and shape of housing 2 to define a gap 5*a* of predetermined width between substrate 4 and housing 2 when the same are assembled. The illustrated catalytic converter 1 also includes a mat 6 having a size and shape configured to cover the exterior surface 5 of substrate 4, a predetermined thickness which is greater than the width of the gap 5*a* and a radially compressible construction that is compressed inwardly against the exterior surface 5 of substrate 4 to a predetermined final assembled mat density that creates a tight friction fit between housing 2 and substrate 4 when the same are assembled into a finished catalytic converter 1. Mat 6 is wrapped around the outer surface 5 of substrate 4 to define a wrapped substrate 7, as shown in FIGS. 4 and 5. The wrapped substrate 7 is inserted or hard stuffed into the interior 3 of housing 2, thereby radially compressing the mat 6 to its predetermined final assembled mat density. In the example illustrated in FIGS. 4-7, the hard stuffing is achieved by using a reciprocating ram 8 that extends at a predetermined, relatively constant speed. As shown in FIG. 2, the method also includes the steps of regularly measuring the force applied by ram 8 to the wrapped substrate 7 during the stuffing step, and regularly recording the ram force and the associated position of the ram 8. After the hard stuffing step is fully completed, the method then includes the steps of comparing the substrate insertion or stuffing force as a function of the position of the wrapped substrate 7 and/or ram 8 to define an array of data, and analyzing the array of data to ascertain the existence of any abrupt change in the stuffing or ram force as a function of the position of the wrapped substrate 7 and/or ram 8 above a predetermined ratio which indicates a crack in the fully assembled compressed wrapped substrate 4 portion of the finished catalytic converter 1.

Figure 3:
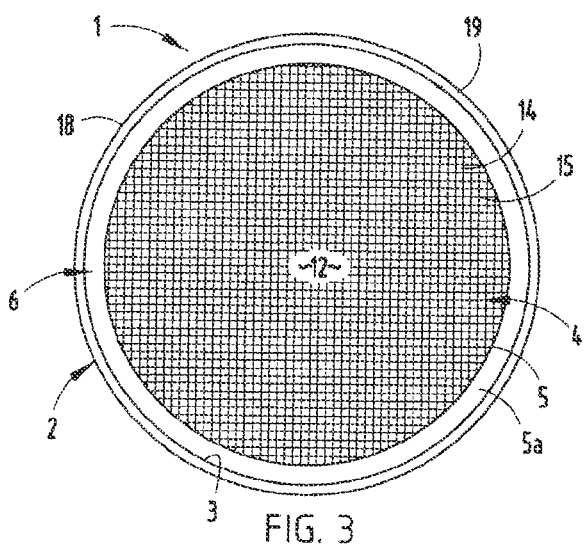
FIG. 3 is an end view of the assembled catalytic converter shown in FIG. 1.

The illustrated substrate 4 has a generally cylindrical shape, including flat, circular top and bottom surfaces 12 and 13, which are arranged in a generally mutually parallel relationship. Substrate 4 is constructed from a suitable catalytic converter material, such as cordierite, silicon carbide, aluminum titanate or the like, and has a honeycomb construction defined by a plurality of axially extending cells 14 having a common shape and open ends 15. In the example illustrated in FIGS. 3 and 9, cells 14 have a substantially square end elevational configuration, although it is to be understood that the same may assume alternative shapes.

The illustrated housing 2 has a generally cylindrical shape similar to the size and shape of substrate 4 to receive the same within the interior 3 thereof. The illustrated housing 2 includes a cylindrical sidewall 18 which defines a circular end edge 19 at one end thereof and a reduced neck portion 20 at the opposite end thereof. Housing 2 has a rigid construction, and is typically constructed from a metal, such as steel or the like, which is capable of withstanding the substantial heat and high temperatures associated with engine exhaust gases.

The illustrated mat 6 is insulative in nature, and as best shown by the broken lines in FIG. 1, is in the form of a rectangular strip 24 having one end edge 25 with a centrally located notch 26 therein, and an opposite end edge 27 with a centrally located tab 28 configured for close reception within the notch 26 of end edge 25. Strip 24 is wrapped into a cylindrical shape as shown by the full lines in FIG. 1, to cover the exterior surface 5 of substrate 4, with tab 28 located in notch 26. The illustrated mat 6 covers the entire exterior surface 5 of substrate 4, and may be constructed from an intumescent material which swells or expands when heated.

FIGS. 4-7 illustrate an exemplary apparatus or assembly machine 35 suitable for performing the methods disclosed herein. More specifically, the illustrated assembly machine 35 includes a pair of reciprocating jaws 36 which clamp around the wrapped substrate 7, and hold substrate 4 and mat 6 closely together prior to insertion into the interior 3 of housing 2. Jaws 36 are slidably mounted on top of a stuffing plate 37 having a tapered mat compression aperture or funnel 38 disposed therein. A ram 39 is operably connected with jaws 36, and shifts the same horizontally along stuffing plate 37 between the load position illustrated in FIG. 4, and the insertion position illustrated in FIG. 5. A housing retainer 41 is slidably mounted on a base plate 42 and includes a central aperture in which housings 2 are closely received. A ram 43 shifts base plate 42 and housing retainer 41 horizontally between the load position illustrated in FIG. 4, and the insertion position illustrated in FIG. 5.

The assembly machine 35 illustrated in FIGS. 4-7 also includes a vertically reciprocating ram 48 with a lower end 49 shaped to abut the upper end of the wrapped substrate 7 during assembly, without damaging the same. A pressure and/or force sensor 50 is mounted in ram 48 and measures the force necessary to insert each of the individual wrapped substrates 4 into its associated housing 2 at a predetermined, relatively constant speed. In the illustrated example, the pressure and/or force data is communicated to a processor 51, equipped with a programmable logic controller, and having a display 52. Ram 48 also includes a sensor which detects the vertical position of lower end 48, which data is also communicated to processor 51.

In the insertion position illustrated in FIG. 5, jaws 36, funnel 38 and housing retainer 41 are vertically aligned, such that the wrapped substrate 7 in jaws 36 is disposed directly above the interior 3 of the housing 2 positioned on housing retainer 41. Vertically extending ram 48 is positioned directly above the aligned wrapped substrate 7 and housing 2, and is extended or lowered at a predetermined, relatively constant speed to insert or stuff wrapped substrate 7 into the interior 3 of housing 2. As the wrapped substrate 7 passes through funnel 38, mat 6 is radially compressed to facilitate insertion into the interior 3 of housing 2, and then expands to create a tight friction fit therebetween. As ram 48 extends or lowers during the hard stuffing step, the force applied by ram 48 to the wrapped substrate 7 is regularly measured by sensor 50, and the measured force is recorded in processor 51, along with the associated position of ram 48. An electronic load/deflection signal analysis technique is used for each individual part to detect cracks, fractures, breaks, etc. in the assembled substrate 4, wherein the stuffing force is then compared to the position of the ram to define an array of data, which is analyzed for any abrupt changes in the stuffing force as a function of the position of the ram 48 indicating a crack in the assembled substrate 4.

Figure 8:
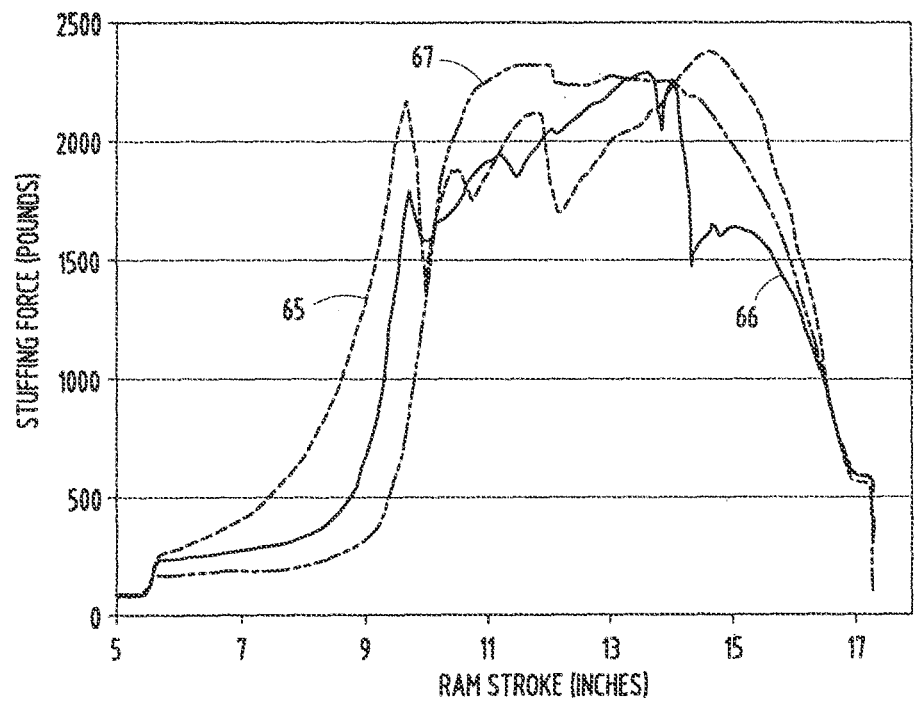
FIG. 8 is a graph of the substrate stuffing force as a function of the position of the wrapped substrate during the hard stuffing process.

For example, in the graph illustrated in FIG. 8, broken line 65 and full line 66 are generally curvilinear, but both reflect abrupt changes in the stuffing force as a function of the position of the ram at the peak or spike portions of the lines 65, 66, which indicate a crack in the assembled substrate 4. In other words, an abrupt change in the slope of any of the graph lines 65-67 signifies the likelihood of a crack or break in the associated substrate 4. In comparison, the dashed line 67 has a relatively continuous curve, with no peaks or spikes, which indicates that the assembled substrate 4 has not been cracked during the stuffing process. Preferably, the stuffing force/ram position graph for each catalytic converter being assembled is displayed contemporaneously with the stuffing process on display 52, such that the assembler has an immediate indication as to the quality of the assembled part. If the graphic illustration shown on display 52 indicates that the substrate 4 has been cracked during stuffing, the crack is thus automatically detected, and the cracked substrate 4 is preferably automatically removed from the associated housing 2, which housing 2 then may be reused for making another catalytic converter 1.

Figure 9:
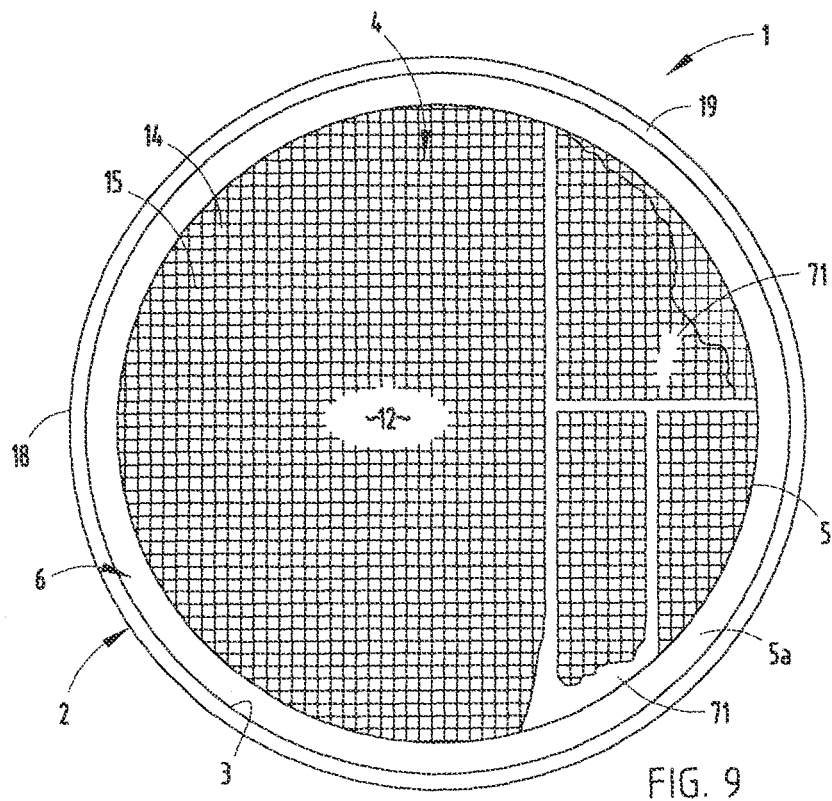
FIG. 9 is a plan end elevational view of a cracked substrate detected during the digital image recording process.

As shown in FIG. 2, after the substrate 4 has been hard stuffed into the interior 3 of housing 2 as outlined above, a digital image of at least one of the end wall surfaces 12 of the substrate 4 may be taken and recorded, as illustrated in FIG. 9. In the example illustrated in FIG. 7, an optical instrument, such as digital camera 70, is positioned over the unload station of assembly machine 35, and takes a digital picture of the upper end of the assembled catalytic converter 1. The image is preferably processed with computer-aided image processing to count contrasting pixels, and identify irregularities in the shape of the cells indicating a break or crack in the substrate 4, such as the broken or collapsed areas 71 shown in FIG. 9. The image processing step may include computer-aided blob tool software, which identifies areas of the end wall surface of the substrate having a non-uniform density of the cells.

As will be apparent to those skilled in the art, the load/deflection analysis crack detection technique, and the digital imaging crack technique, as described above, can be used either separately, or together. When used together, additional accuracy and reliability are realized, particularly when the digital imaging technique is performed after the load/deflection analysis technique.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. A hard stuff method for making catalytic converters with automated substrate crack detection, comprising the following steps:
    forming a rigid housing with a hollow interior into a predetermined final size and shape;
    providing a catalytic converter substrate having an exterior surface and a predetermined size and shape similar to the final size and shape of the housing to define a gap of predetermined width between the substrate and the housing when the same are assembled;
    forming a mat having a size and shape configured to cover the exterior surface of the substrate, a predetermined thickness which is greater than the width of the gap, and a radially compressible construction that is compressed inwardly against the exterior surface of the substrate to a predetermined final assembled mat density that creates a tight friction fit and seal between the housing and the substrate when the same are assembled into a finished catalytic converter;
    wrapping the mat around the outer surface of the substrate to define a wrapped substrate;
    radially compressing the wrapped substrate to the predetermined final assembled mat density to define a compressed wrapped substrate;
    hard stuffing the compressed wrapped substrate axially into the interior of the housing with the predetermined final size and shape using a reciprocating ram which extends at a predetermined, constant speed to define the finished catalytic converter without resizing the housing;
    regularly measuring the force applied by the ram to the compressed wrapped substrate during said hard stuffing step;
    regularly recording the ram force and the associated position of the ram during said hard stuffing step;
    after said hard stuffing step is fully completed to define the finished catalytic converter, comparing the ram force as a function of the position of the ram to define an array of data;
    after said hard stuffing step is fully completed to define the finished catalytic converter, analyzing the array of data and ascertaining the existence of any abrupt change in the ram force as a function of the position of the ram above a predetermined ratio which indicates a crack in the fully assembled compressed wrapped substrate portion of the finished catalytic converter; and
    unstuffing the fully assembled compressed wrapped substrate from the housing upon detection of a crack in the substrate during said data analyzing step.

2. A method as set forth in claim 1, wherein:
said unstuffing step comprises automatically unstuffing the fully assembled compressed wrapped substrate from the housing upon detection of a crack in the substrate during said data analyzing step.

3. A method as set forth in claim 1,
wherein said substrate providing step includes providing the substrate with a marginal sidewall surface, opposite end wall surfaces, and a honeycomb construction defined by a plurality of axially extending cells with a common shape and open ends;
wherein after said hard stuffing step, the method includes recording a digital image of at least one of the end wall surfaces of the substrate; and
processing the image with computer-aided image processing to identify irregularities in the shape of the cells indicating a crack in the substrate.

4. A method as set forth in claim 1, wherein:
said force comparing step includes displaying a graph of the force as a function of the position of the ram.

5. A method as set forth in claim 1, wherein:
said data analyzing step includes processing the array of data with a programmable logic controller.

6. A method as set forth in claim 1, wherein:
said graph displaying step includes creating a generally curvilinear graph; and
said data analyzing step includes identifying abrupt changes in the slope of the curvilinear graph.

7. A method as set forth in claim 3, wherein:
said image processing step includes processing the image with computer-aided blob tool software.

8. A method as set forth in claim 3, wherein:
said image processing step identifies areas of the one end wall surface of the substrate having a non-uniform density of the cells.

9. A method as set forth in claim 3, wherein:
said image recording step and said image processing step are performed after said substrate inserting step.

10. A method as set forth in claim 3, wherein:
said image recording step and said image processing step are performed after said data analyzing step.

11. A method as set forth in claim 1, wherein:
said substrate providing step includes forming the substrate from cordierite, silicon carbide or aluminum titanate.

12. A method as set forth in claim 11, wherein:
said substrate providing step includes providing the substrate with a marginal sidewall surface, opposite end wall surfaces, and a honeycomb construction defined by a plurality of axially extending cells with a common shape and open ends; and including recording a digital image of at least one of the end wall surfaces of the substrate; and
processing the image with computer-aided image processing to identify irregularities in the shape of the cells indicating a crack in the substrate.

13. A method as set forth in claim 12, wherein:
said data analyzing step includes processing the array of data with a programmable logic controller.

14. A method as set forth in claim 13, wherein:
said substrate providing step includes forming the substrate from cordierite, silicon carbide or aluminum titanate.

15. A method as set forth in claim 2, wherein:
said substrate providing step includes providing the substrate with a marginal sidewall surface, opposite end wall surfaces, and a honeycomb construction defined by a plurality of axially extending cells with a common shape and open ends; and including recording a digital image of at least one of the end wall surfaces of the substrate; and processing the image with computer-aided image processing to identify irregularities in the shape of the cells indicating a crack in the substrate.

16. A method as set forth in claim 3, wherein:
said force comparing step includes displaying a graph of the force as a function of the position of the ram.

17. A method as set forth in claim 16, wherein:
said graph displaying step includes creating a generally curvilinear graph; and said data analyzing step includes identifying abrupt changes in the slope of the curvilinear graph.

18. A method as set forth in claim 17, wherein:
said data analyzing step includes processing the array of data with a programmable logic controller.

19. A method as set forth in claim 18, wherein:
said substrate providing step includes forming the substrate from cordierite, silicon carbide or aluminum titanate.

* * * * *